(12) United States Patent
Wood et al.

(10) Patent No.: US 6,648,647 B2
(45) Date of Patent: Nov. 18, 2003

(54) TOY HAVING ROTATING ELEMENT

(75) Inventors: Michael C. Wood, Orinda, CA (US); Jorge Gabriel Soto, Concord, CA (US); Barbara Mattson, Fairfield, CA (US)

(73) Assignee: Leapfrog Enterprises, Inc., Emeryville, CA (US)

( * ) Notice: Subject to any disclaimer, the term of this patent is extended or adjusted under 35 U.S.C. 154(b) by 0 days.

(21) Appl. No.: 10/177,536

(22) Filed: Jun. 21, 2002

(65) Prior Publication Data
US 2003/0003427 A1 Jan. 2, 2003

Related U.S. Application Data
(60) Provisional application No. 60/302,731, filed on Jul. 2, 2001.

(51) Int. Cl.[7] .................................................. G09B 1/22
(52) U.S. Cl. ........................ 434/174; 446/241; 446/265
(58) Field of Search ................................. 434/159, 161, 434/167, 168, 169, 173, 174; 446/236, 241, 247, 265, 266

(56) References Cited

U.S. PATENT DOCUMENTS

| | | | | |
|---|---|---|---|---|
| 3,383,114 A | * | 5/1968 | Ryan | 369/30.02 |
| 3,391,476 A | | 7/1968 | Sher | |
| 3,719,002 A | * | 3/1973 | Jernstrom | 446/397 |
| 3,745,673 A | * | 7/1973 | Jimerson et al. | 434/332 |
| 3,939,577 A | * | 2/1976 | Amano | 434/129 |
| 4,021,940 A | * | 5/1977 | Saint | 434/348 |
| 4,166,326 A | * | 9/1979 | Schramm | 434/327 |
| 4,353,700 A | | 10/1982 | Volakakis | |
| 4,379,698 A | * | 4/1983 | Boyd | 434/106 |
| 4,389,193 A | * | 6/1983 | Phillips | 434/174 |
| 5,041,048 A | * | 8/1991 | Lehmann et al. | 446/236 |
| 5,238,440 A | * | 8/1993 | Morin | 446/241 |
| 5,314,338 A | * | 5/1994 | Caveza et al. | 434/259 |
| 5,906,369 A | * | 5/1999 | Brennan et al. | 273/238 |
| 5,944,533 A | | 8/1999 | Wood | |
| 6,017,260 A | * | 1/2000 | Dolan | 446/298 |

OTHER PUBLICATIONS

Web page, "See 'n Say," at URL=http://www.yesterdayland.com/popopedia/shows/toys/ty1066.php, 2 pages, (2000).

* cited by examiner

Primary Examiner—Kurt Fernstrom
(74) Attorney, Agent, or Firm—Townsend and Townsend and Crew LLP

(57) ABSTRACT

A toy is disclosed. In one embodiment, the toy includes a base. A rotating element is on the base and rotates about an axis. A child can cause the rotating element to rotate about the axis by pressing an actuator at the center of the rotating element. A set of image elements can be on the rotating element.

28 Claims, 13 Drawing Sheets

TOY HAVING ROTATING ELEMENT

CROSS-REFERENCE TO RELATED APPLICATIONS

This application claims the benefit of U.S. Provisional Patent Application No. 60/302,731, filed Jul. 2, 2001. This U.S. Provisional Patent Application is assigned to the same assignee as the present application and is herein incorporated by reference in its entirety.

BACKGROUND OF THE INVENTION

Children learn letters, numbers and the names of various objects by audible repetition accompanied with visualization. For example, often, a parent or teacher will read a book aloud while pointing to an object depicted by a word, which is read. In this way, the child is able to visually associate the object with its name. This method of teaching is generally passive, i.e., there may be little interaction between the child and the subject matter being taught.

Commercially available electronic learning toys improve upon these passive teaching methods. Commercially available electronic learning toys teach children about certain subjects while allowing children to physically interact with them. A typical electronic learning toy may have a number of buttons in the form of letters. After depressing a letter, the electronic toy might recite back the name of the letter as well as the phonetic sound of the letter. For example, after a child presses a button in the shape of the letter F, the toy may say "F, F says fuh. The word 'fish' starts with F". Using such toys, children can receive audio and visual instruction on a particular subject, and can press buttons to further reinforce the subject matter being taught by the toys.

Although such toys are useful for their intended purpose, improvements could be made. For example, in many conventional electronic toys, the child's physical interaction with the toy is limited to pressing buttons. Accordingly, the child's manipulation of the toy and the toy's movement is minimal. Consequently, the child is not able to practice manipulation skills using the toy. In addition, because of the toy's limited ability to move or be moved, the toy may not be able to capture the child's initial interest and/or may not be able to keep the child's interest over time.

One toy that does use motion to entertain a child is the See n' Say™ toy. This toy has a lever on its side. The lever can be pulled down by the child. After pulling the lever, a pointer in the middle of the toy spins. Eventually, the pointer stops and the pointer may end up pointing to, for example, a picture of a pig. After the pointer stops, the toy may then produce the sound of a pig, thus entertaining the child.

Although the See n' Say™ toy is entertaining, the only physical interaction that the child has with the toy is pulling the side lever down. The pointer is not directly manipulated by the child during the ordinary use of the toy. Like the previously described toys, the child's ability to manipulate the See n' Say™ toy or cause the See n' Say™ toy to move is minimal and is practically the same each time the child interacts with the toy. Thus, a child cannot practice or improve his manipulation skills. Moreover, because the child's ability to physically manipulate the toy is minimal, learning is not reinforced by physical manipulation. Moreover, the functionality of the See n' Say™ toy is limited. To the extent that the toy provides instruction to the child, the instruction is only declaratory in nature. Because of its limited functionality, a child may also quickly lose interest in the See n' Say™ toy.

Accordingly, new and improved toys would be desirable. Embodiments of the invention address these problems individually and collectively), as well as other problems.

SUMMARY OF THE INVENTION

Embodiments of the invention are directed to toys including rotating elements. Preferably, the toys according to embodiments of the invention are directed to educational toys.

One embodiment of the invention is directed to a toy comprising: a) a base; b) a rotating element on the base, wherein the rotating element is adapted to rotate about an axis; c) a first set of image elements on the rotating element, wherein each image element in the first set is positioned at a first radial distance from the axis; and d) a second set of image elements on the rotating element, wherein each image element in the second set is positioned at a second radial distance from the axis, wherein the first distance is different than the second distance.

Another embodiment of the invention is directed to a toy comprising: a) a base; b) a rotating element on the base, wherein the rotating element rotates about an axis; c) a set of image elements on the rotating element, wherein each image element is positioned at a radial distance from the axis; and d) an actuator (e.g., comprising a depressible element) coupled to the rotating element.

Another embodiment of the invention is directed to a toy comprising: a) a base; b) a rotating element on the base and having a center; and c) an actuator including a depressible element at the center of the rotating element, wherein the rotating element is adapted to rotate after the actuator is depressed.

These and other embodiments are described in greater detail below with reference to the Figures.

DETAILED DESCRIPTION

Figure 1:
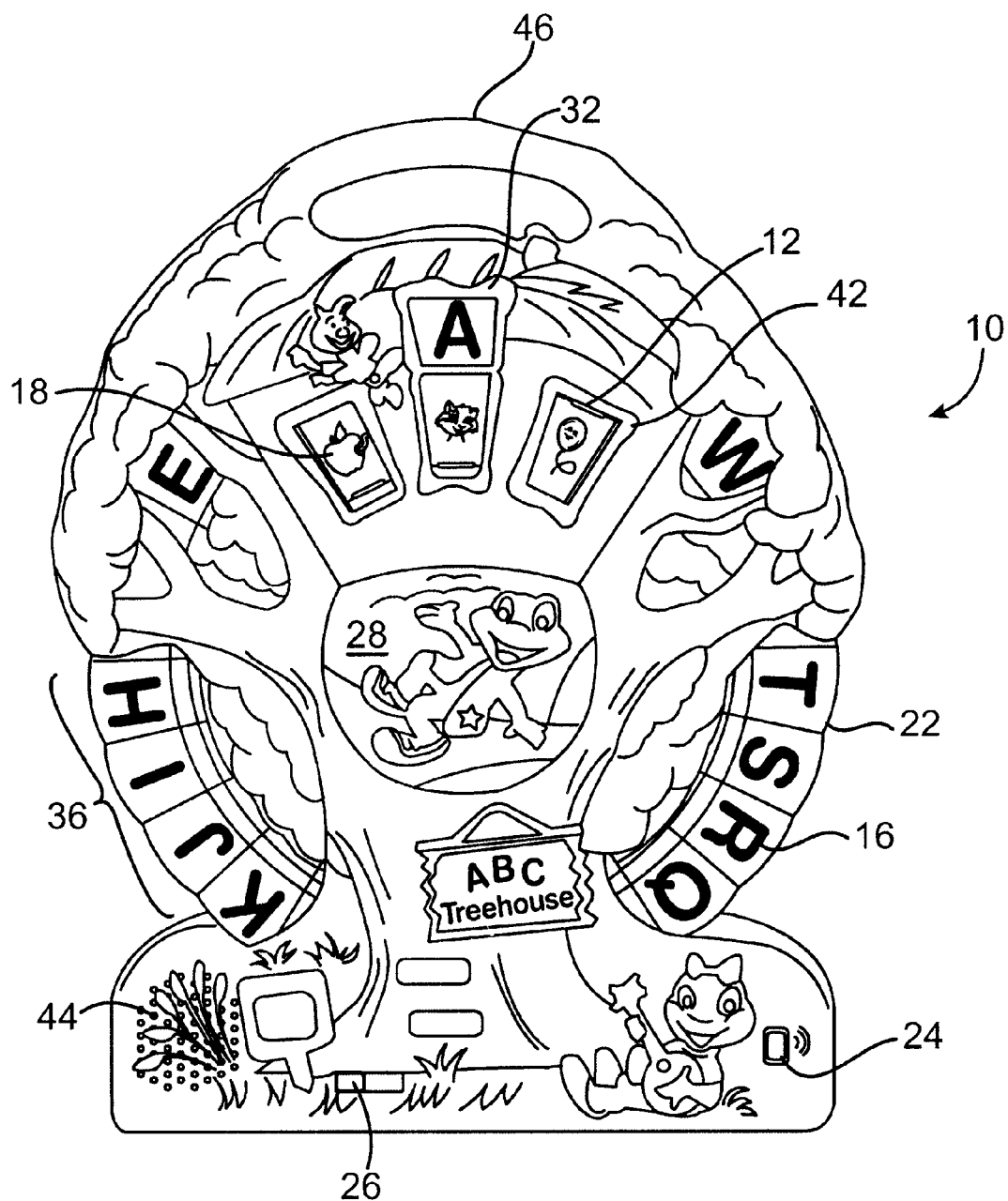
FIG. 1 shows a frontal view of a toy according to an embodiment of the invention.

For purposes of illustration, many of the embodiments described below are described with reference to a child. In some embodiments of the invention, the user is a child that is greater than about 18 months old. Preferably, the user is a child that is less than about 10 years of age. Although children are discussed in detail, it is understood that the user in embodiments of the invention could be of any suitable age (e.g., an adult).

The toys according to embodiments of the invention can teach children about one or more predetermined subjects. Exemplary subjects include number recognition, alphabetical order, number association, letter recognition, letter/word association, letter/word pronunciation, object relationships (e.g., a ball and a bat, a knife and a fork, etc.), phonics, spelling, math (including addition, subtraction, division, and multiplication), animals and animal sounds, vehicles and vehicle sounds, history, geography, counting, etc. The toys according to embodiments of the invention can also help children develop cognitive skills, perceptual skills, and motor skills. They can also teach the child the relationship between cause and effect. Accordingly, embodiments of the invention may be characterized as educational toys.

In other embodiments, the toy need not teach the child about a predetermined subject, but can simply be used to entertain a child. For example, in some embodiments, a rotating element can have a number of images that can blend together while the rotating element is rotating so that a unique rotating image is presented to the child. In such embodiments, the toy need not be per se educational, but could instead be primarily entertaining and/or amusing to a child.

An exemplary toy according to an embodiment of the invention may comprise a base and a rotating element on the base. The rotating element can be adapted to rotate about an axis. The "axis" can be a reference point in the toy and can pass through a point about which the rotating element rotates. The axis need not be an actual structural element in the toy. In some embodiments, the rotating element includes a first set of image elements. Each image element in the first set is positioned at a first radial distance from the axis. The rotating element can also include a second set of image elements. Each image element in the second set is positioned at a second radial distance from the axis. The first distance can be different than the second distance so that the first set of image elements and the second set of image elements respectively form two circles of different radii. In some embodiments, the image elements in the first set can correspond to image elements in the second set. For example, the first set may comprise images of letters and the second set may comprise images of objects that have names that start with the letters in the first set.

To operate the exemplary toy, a child manipulates an actuator (e.g., presses the actuator) to spin the rotating element around and around. In preferred embodiments, the actuator is in the form of a large, depressible button that moves perpendicular to the orientation of the rotating element. After the rotating element stops rotating, image elements from the first set and images elements from the second set are specifically presented to the child. For example, specific image elements may be exposed through a number of windows in a cover that is over the rotating element. In some embodiments, the cover may include a single window and a set of windows. The image element in the single window may be used to prompt the child, while the image elements in the set of windows may form a limited answer set from which the child may choose. For instance, an image element can be exposed through the single window, and the user may be requested to pick one of the image elements exposed through the set of windows that corresponds to the image element in the single window. For example, the single window may have the letter B in it, while the set of windows may show a ball, glove, and shoe. The toy may request that the user pick the object that starts with the letter B. If the child selects the wrong image element in the set of windows, the name of the image element can be stated to the user and the toy may request that the user try again. If the child selects the correct image element, the toy may provide a congratulatory message or sound effect for the user. In embodiments of the invention, audio outputs from the toy can prompt the child for a response, reinforce concepts taught by the image elements, and/or congratulate the child for successful responses.

Embodiments of the invention have a number of advantages. First, in embodiments of the invention, a child can physically manipulate the toy in different ways. In embodiments of the invention, a child can cause the rotating element to spin by either using an actuator or grasping the rotating element directly. By directly grasping the rotating element, the child also can manually place particular images within particular windows to cause the toy to produce a particular output and/or to respond to an inquiry produced by the toy (e.g., "can you put the letter A in the top window?"). In this process, the child aligns an image element with a window to obtain the correct answer and the child is able to improve his manipulation skills using embodiments of the invention. The manipulation of the rotating element reinforces learning (i.e., audial and visual instruction reinforced by kinesthetic activity). Second, the spinning motion of the rotating element is entertaining to the child. The rotating motion is capable of capturing the initial interest of a child and is also capable of retaining the child's interest. Lastly, as noted below, embodiments of the invention have a plurality of different learning modalities. The toy can provide, for example, declaratory instruction, questions for the child to answer, and the ability to practice manipulation skills. The toy uses a number of different learning modalities so that learning is reinforced in many different ways. These learning modalities can be preprogrammed into the memory of the toy.

FIG. 1 shows a toy 10 according to an embodiment of the invention. A handle 46 is provided at the top of the toy 10 to allow a child to carry it. An actuator 28 in the form of a depressible element is at the center of the toy 10 and passes through a cover 70. The actuator 28 is coupled to the rotating element 22. When it is depressed, the actuator 28 causes the rotating element 22 to spin. A speaker 44 is near the bottom of the toy 10 to provide audio outputs for the child. Audio sequences may be played by the toy 10 before, during and after, the spinning of the rotating element 22.

The toy 10 may have any suitable dimensions. For example, in some embodiments, the toy 10 may be less than about 12.5 inches high and less than about 3 inches thick, while the rotating element 22 can be less than about 9 inches in diameter. The toy may be portable and can be easily carried by a child.

In the illustrated example, the cover 70 partially covers a rotating element 22, which is in the form of a circular wheel. The circular wheel has an undulating edge and is on a base (not shown). When it spins, the rotating element 22 spins between the base and the cover 70. The cover 70, the base, and the rotating element 22 may be made of molded plastic.

Various mechanical switches may be provided in the toy 10. A child may use these switches to alter the operation of the toy. For example, in the example shown in FIG. 1, a volume switch 24 (e.g., high and low volume) and a mode selection switch 26 are near the bottom of the toy 10. A child can use the volume switch 24 to adjust the volume of the toy 10. The mode selection switch 26 can allow the toy 10 to be in different modes. For example, the mode selection switch 26 can allow the child to turn the toy 10 off, place the toy 10 in a learn mode or place the toy 10 in a game mode.

One or more images of animated characters may be on the toy 10. For example, in the toy 10 shown in FIG. 1, a 3-dimensional relief image of a frog is on the actuator 28. This image can be used to help prompt the child to press the actuator 28. For example, the toy 10 (e.g., using a speech synthesizer chip) can prompt the child to press the 3-dimensional image of the frog to spin the rotating element 22. Other animated character images may also be on the toy 10. The other animated character images on the toy (e.g., the firefly near to top of the toy 10) can be functional or non-functional. For example, in some embodiments, the animated character images may be pressure sensitive switches that can be depressed by a child. The toy 10 can produce some output in response to the activation of these pressure sensitive switches. For example, after depressing the frog near the bottom of the tree in FIG. 1, the toy 10 may play a song.

The child can spin the rotating element 22 so that it rotates around an axis (not shown). The axis passes through the center of the rotating element 22 and is generally perpendicular to the plane of the rotating element 22. Illustratively, a child may press down on the 3-dimensional image of the frog on the actuator 28. The actuator 28 then moves downward relative to the cover 70 or vertically with respect to the orientation of the rotating element 22. The downward motion of the actuator 28 causes the rotating element 22 to spin. A spiral screw (not shown) and gear-like elements with teeth (not shown) inside of the toy 10 translate the downward motion of the actuator 28 into a rotating motion. Eventually, the rotating element 22 stops so that one letter in the first set of image elements 16 is shown in the first window 32 and a set of image elements 18 is exposed through the set of windows 42. In the illustrated embodiment, three image elements (e.g., images of a ball, cat, and a balloon) are shown in the set of windows 42. As will be explained in further detail below, a magnetic element (not shown) in the toy 10, can stop the rotating element 22 at an appropriate position so that certain image elements from the first and second image elements 16, 18 are automatically aligned with the windows 32, 42.

The child can also manipulate the rotating element 22 by grasping the rotating element 22 in the open region 36. After grasping the rotating element 22, the child can move the rotating element 22 clockwise or counterclockwise. In some embodiments, the child can spin the rotating element 22 fast by grasping the side of the rotating element 22. In other embodiments, the child can carefully move the rotating element 22 so that selected image elements in the first and second sets 16, 18, are exposed through the windows 32, 42. In this way, the child can actually input information (e.g., responses) into the toy 10 using the rotary element 22. For example, the toy 10 may ask the user to put the letter A in the top window (first window) 32. The child then deliberately rotates the rotating element until the letter "A" shows in the first window 32. After the letter A shows in the first window 32, the toy may automatically say "A, A says ahh". This is unlike many conventional toys that only have buttons that allow the child to input a response.

Although the actuator 28 is in the form of a large depressible button in the example shown in FIG. 1, the actuator could take other forms in other embodiments of the invention. For example, the actuator could be in the form of a lever that is disposed to the side of the toy 10. To spin the rotating element 22, the child pulls the lever down. In yet other embodiments, the actuator could be a string that is pulled by the user. However, a depressible actuator 28 is desirable, since it is easier for a child to operate (e.g., a pushing instead of a pulling motion). The depressible actuator 28 also reduces the lateral width of the toy 10, as compared to a toy with a lever on its side.

The rotating element 22 includes a first set of image elements 16 and a second set of image elements 18. Preferably, the first set of image elements 16 and the second set of image elements 18 relate to each other in some way. For example, in the example shown in FIG. 1, the first set of image elements 16 comprises the letters of the alphabet, while the second set of image elements 18 comprises images of objects that begin with the letters in the first set of image elements 16. For instance, the letter "A" is in the first set of image elements 16, and a corresponding image of an apple is in the second set of image elements 18. In another example, the first set of image elements may comprise uppercase letters while the second set of image elements may comprise lowercase letters. In yet another example, the first set of image elements could comprise images of the numbers 1 through 12, while the second set of image elements could comprises image of representations of the numbers 1 through 12 such as sets of dots, each set of dots having from 1 to 12 dots. In yet another example, the first set of image elements and the second set of image elements could comprise respectively different, but related objects. For example, an object in the first set may be a ball, while a related image in the second set may be a bat.

The first set of image elements 16 and the second set of image elements 18 can include images of any suitable type. Exemplary images include images of symbols, letters, numbers, shapes, and objects. Examples of desirable objects are those easily identified or recognized by young children. Such objects may include images of cats, dogs, balloons, apples, vehicles,(e.g., cars, trains), etc.

The letters in the fist set of image elements 16 are arranged in a first circle. Each letter is located at about the same distance, or a first distance, from the center of the first circle. Each image in the second set of image elements 18 may be located at the same distance, or a second distance, from the center of a second circle formed by the second set of image elements 18. An axis (not shown) may pass through the centers of the first and second circles and may be perpendicular to the first and second circles. The first distance and the second distance may be different. In this example, the first distance is greater than the second distance.

The cover 26 can also include a number of windows 32, 42. It is understood that the size, location, and number of windows 32, 42 in the cover 70 may vary in embodiments of the invention. In the illustrated example, a first window 32 selectively exposes image elements from the first set of image elements 16. A set of windows 42 selectively exposes image elements from the second set of image elements 18. The first window 32 is at a first distance from the axis passing through the rotating element 22, while each window in the set of windows 42 is at a second distance from the axis.

In this example, the image element in the first window 32 can be used to prompt the child for a response, while the image elements in the set of windows 42 can be a group of image elements from which the child may select an answer.

For example, the letter A is shown in the first window 32, and an apple, cat, and a balloon are shown in the set of windows 42. In this example, the apple may be the correct second image element that corresponds to the letter A, and the user can select the apple by opening or closing the door 12 associated with the window showing the apple.

Other mechanisms for selectively identifying image elements can be used instead of windows. For instance, instead of windows, identifiers such arrows that are printed on the cover can be used to selectively identify one or more image elements for the user. Whatever type of image element identifier is used, one or more identifiers (e.g., one or more windows) may identify one or more image elements from the first set of image elements. In addition, one or more identifiers (e.g., windows) can identify one or more image elements in the second set of image elements.

The set of windows 42 may include sliding doors 12 that can be manipulated by a child. The doors 12 may be solid or partially translucent or transparent. For example, in some embodiments, the doors 12 can have apertures in the form of a heart, crescent, and star so that the child can partially see through the doors 12.

Switches may be associated with the sliding doors 12 so that the child can provide responses to the toy 10 via the sliding doors 12. In some embodiments, the sliding doors 12 are in a closed position when the child is not manipulating them. The child can open the sliding doors 12 to input specific responses into the toy 10. In other embodiments, the sliding doors 12 may be in an open position when the child is not manipulating them, and the child can close them to input specific responses into the toy 10. Other input devices could be used in other embodiments. For example, depressible buttons (not shown) could be below each window and the user could depress the appropriate button to select a particular image element within a window.

The set of windows 42 and the corresponding sliding doors 12 may be colored with different colors to allow the child to select a particular window. For example, the windows in the set of windows 42 may be colored red, blue, and green. Thus, the toy 10 can prompt the child by asking the child to open a colored door. For example, the toy 10 may ask the child, "can you open the green door?", or "what did the letter B hide behind the yellow door?".

The cover 22 (and the toy generally) may also be shaped in a way that is inviting to children. The cover 22 can be colored with bright colors and/or may have images of animated characters on it. For example, as shown in FIG. 1, the cover 22 may be in the form of a tree.

The cover 22 may also include an open region 36 that does not cover a portion of the rotating element 22. A child may manipulate the rotating element 22 by grasping the exposed portion of the rotating element 22. The child may thus rotate the rotating element 22 manually without depressing the actuator 28. The child's manipulation skills can be tested and improved by manually grasping the rotating element 22. For example, a speech synthesizer in the toy 10 may ask the child to place the letter "A" in the first window. The child may the grasp the rotating element 22 and rotate it until the letter "A" is in the window 32. A reward such as a congratulatory message can be played for the child if the child is successful. If the child is not successful, the toy 10 could provide hints such as "the letter A comes before the letter B".

The mode selection switch 26 can allow a child select from two or more operational modes. Exemplary operational modes include a learn mode and a game mode. Further specific details about game modes and the learn modes suitable for use in embodiments of the invention are provided in U.S. Provisional Patent Application No. 60/302,731, filed Jul. 2, 2001. This U.S. Provisional Patent Application is herein incorporated by reference in its entirety.

In some embodiments, the toy 10 can have a learn mode. In the learn mode, the child can press the actuator 28 to spin the rotating element 22 or could spin the rotating element 22 by directly grasping the rotating element 22 in the open region 36. As the rotating element 22 spins, the toy 10 may play a song or sound effects. After a period of time, the rotating element 22 stops rotating. If, for example, the letter "B" is shown in the window 32 (e.g., after rotating the rotating element 22), after a predetermined amount of time (e.g., 2 seconds) at that position, the toy 10 can say, "B says buh". After this, the toy 10 may prompt the child to open one of the three doors 12. Although there are three doors 12, only one door may contain the object, which corresponds to the letter in the window 32. The suggested door 12 could have an image of an object, where the name of the object begins with the letter B. For example, the toy 10 may have a blue, red, and yellow doors, and the toy 10 may prompt the child to "open the blue door to find a surprise". After opening the blue door, the child may find that an image of a ball is shown through the open window.

In another embodiment, the first window 32 may comprise a translucent or transparent covering. The covering can be coupled to a switch that, when depressed, causes the toy 10 to sound an output that relates to the image shown in the window. After the rotating element 22 stops rotating, the toy 10 can prompt the child to press the first window 32. For example, the letter "B" may be shown in the first window 32 and the toy may prompt the child to press the first window 32 to hear the name and sound of the letter. After the child presses the first window 32, the toy 10 may say "B says Buh!". A display device (not shown) such as an LED could flash as the toy is providing this audio output.

Another mode that can be selected using the mode selection switch 26 can be a game mode. In the game mode, the toy 10 can ask the child to find a letter by rotating the rotating element 22 to place a letter in the first window 32. For example, the toy 10 may ask the child to place the letter "K" in the first window 32. After the child places the letter K in the first window 32, the toy 10 may provide a reward message and then say, "K, says kuh". If the child selects the wrong letter such as the letter Z, the toy 10 may say "you found the letter Z, Z says zuh." After the child selects the right letter, the toy 10 may prompt the child to open one of the doors to find an object that starts with the letter K. For example, the toy 10 may say, "open a door to find an object that starts with the letter K". The doors 12 can be in a closed position and the child can partially see through small apertures in the doors 12. The child may then peek through the apertures to see what objects are partially hidden by the doors 12. For example, images of a key, an octopus, and a gumball machine might be partially visible to the child through the closed doors 12. If the child opens the door covering the image of the key, then the toy 10 may provide a congratulatory message for the child, and the toy 10 may say, "you found the key, flute starts with K". If the child opens the incorrect door such as the door covering the octopus, the toy may say, "you found the octopus, octopus starts with O".

Figure 2:
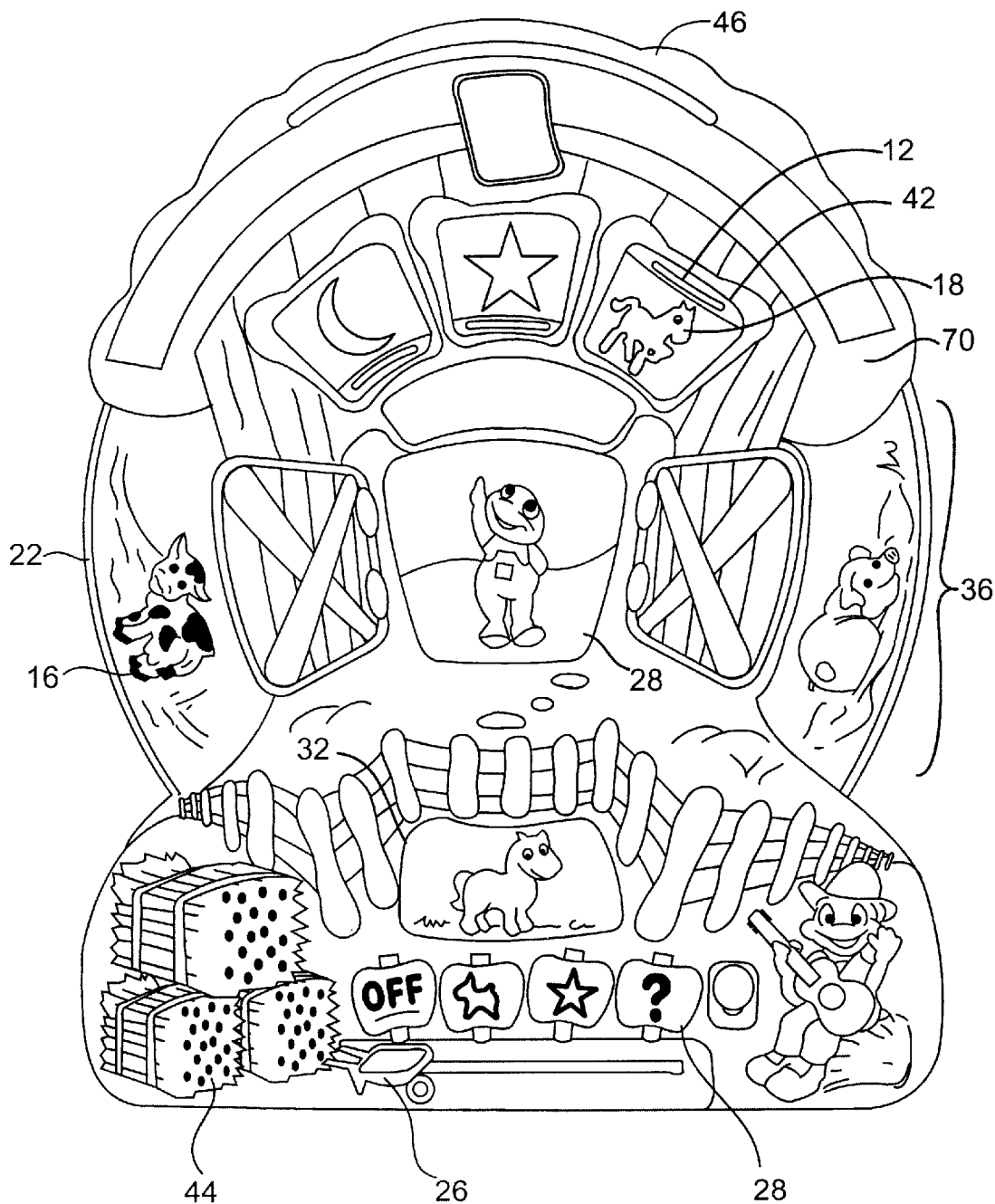
FIG. 2 shows a frontal view of another toy according to an embodiment of the invention.

FIG. 2 shows another toy according to another embodiment of the invention. In FIG. 2, like numerals illustrate like elements in FIG. 1. The illustrated toy 10 can teach a child animal names and sounds, colors, rhyming, and phonics. A child can spin the rotating element 22 and learn animal names and sounds, play a mommy/baby matching game, or add animals to an interactive song. In some embodiments, toy may play suitable music appropriate for the theme for the toy while the rotating element 22 is rotating. For example, the toy 10 shown in FIG. 2 may play "Old MacDonald Had a Farm" when the rotating element 22 is rotating. Such songs and other audio may be encoded in the memory unit of the toy.

The toy 10 includes a rotating element 22 that includes a first set of image elements 16 comprising images of animals (e.g., adult cows, pigs), and a second set of image elements 18 comprises images of other objects and/or animals (e.g., baby animals). The image elements shown in the first window 32 is a horse, which appears to be in a corral that is depicted on the cover 70. The image elements shown in the set of windows 42 include a moon, star, and a horse. Like the prior embodiment, each of the windows in the set of windows 42 may be colored a different color. In this toy embodiment, the child might be asked to open the door 12 covering the image element in the set of windows 42 that corresponds to the image element shown in the first window 32.

The toy 10 may include a mode switch 26 with 4 selectable positions for four modes. The modes include, for example, off, a learn mode, game mode, and a music mode. In this example, the mode switch 26 is in the form a wheelbarrow that slides from left to right and back.

In the learn mode, the toy 10 prompts the child to spin the rotating element 22. When the rotating element 22 stops, the child toy 10 can hear about the mommy animal in the corral (e.g., "Moo, I'm Cora Cow! I'm black and white. My baby's behind the blue window. Open the blue window."). If the child presses the corral, the child will hear more information about the mommy animal (e.g., "Moo. I'm Cora Cow! I make milk. My baby is called a calf."). When the correct door is opened, the toy may respond appropriately (e.g., "It's a little calf! That's my mommy!").

In the game mode, the toy 10 may select one animal as a "hiding" animal. The toy 10 prompts the child to put one of the animals in the corral (i.e., in the first window 32). For example, the toy 10 may say to the child, "Farmer Leap is looking for the cow. Can you put the cow in the corral?" The child may grasp the rotating element 22 at an open region 36 and may carefully rotate the rotating element 22 until the appropriate animal is exposed through the first window 32. If the child puts the correct animal into the first window 32, the toy 10 may further prompt the child. For example, the toy 10 may say "Moo, I'm Cora Cow. Farmer Leap is looking for me! Can you find my baby? Open a window. If the correct door 12 to the correct window 42 is opened, the toy 10 may say, "It's a little calf. Moo! You found my baby! Let's play again!" If the door 12 to the incorrect window is opened, the toy 10 may respond appropriately (e.g., "It's a duckling. That's not MY baby!").

In the music mode, a song may play and the particular objects in one or more of the windows 32, 42 may be added to the song. For example, if a child puts the horse into the first window 32, then a song such as "Old McDonald had a farm" could play with the word "horse" and a whinnying sound being inserted into the appropriate lines in the song. Accordingly, in the music mode, the toy 10 may automatically incorporate a child's input information into the song. Appropriate computer code for accomplishing this and other functions of the toy may be in the memory unit of the toy. Programming the toy to accomplish the toy functions described herein can be done by those of ordinary skill in the art.

In some embodiments, clues may be given if the child puts the wrong animal in the first window 32. The child may also receive a clue by pressing an appropriate button on the toy 10 For example, clues such as the starting sound of the animal's name (e.g., for a pig, an exemplary hint might be "my name starts with the sound puh"), a word that rhymes with the animal's name (e.g., for a pig, an exemplary hint might be "my name rhymes with dig"), a fun fact about the animal (e.g., for a pig, "I like to play in the mud!"), or the animal's color may be provided to the child for each wrong answer input into the toy 10.

Unlike the toy embodiment shown in FIG. 1, in the toy 10 shown in FIG. 2, both the first and the second sets of image elements 16, 18 comprise images of objects. Also, unlike the embodiment shown in FIG. 1, a window 32 can be near the bottom of the toy 10 instead of the top of the toy. Accordingly, in embodiments of the invention, the windows 32, 42, may at any suitable location in the toy 10.

Figure 3A:
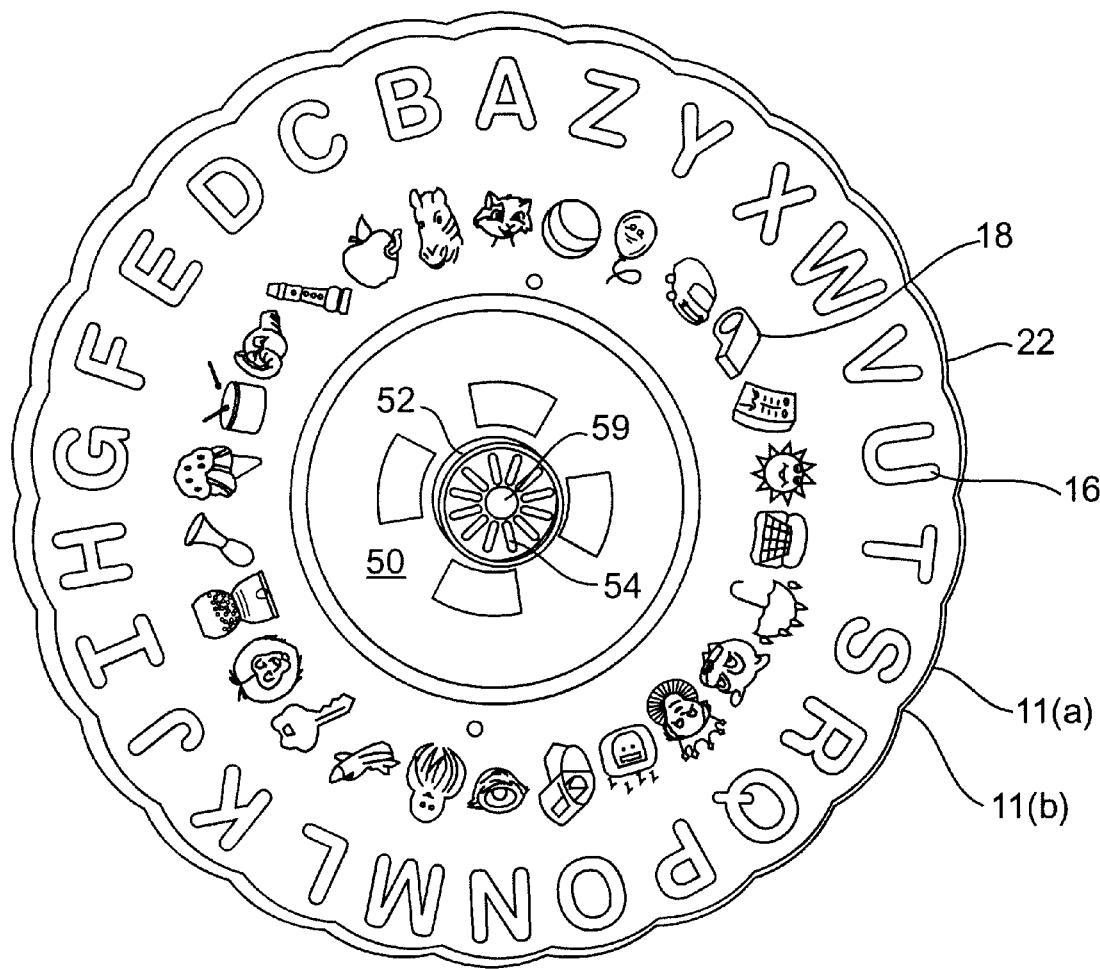
FIG. 3(a) shows a frontal view of a rotating element according to an embodiment of the invention.

FIG. 3(a) shows a plan view of a rotating element 22 according to an embodiment of the invention. In this example, a first set of image elements 16 comprises letters of the alphabet, while a second set of image elements 18 comprises images of objects with names that begin with the letters of the alphabet. A center depression 50 is at the center of the rotating element 22. Within this center depression 50 is a central portion 52 that includes a region with teeth 54. The region with teeth 54 is in the form of a circle that surrounds a hole 59 that corresponds to the center of the rotating element 22. As will be explained in further detail below, a spiral screw element can pass through the hole 59, and a corresponding region with teeth on the front cover of the toy can mate with the region with teeth 54 on the rotating element 22

Figure 3B:
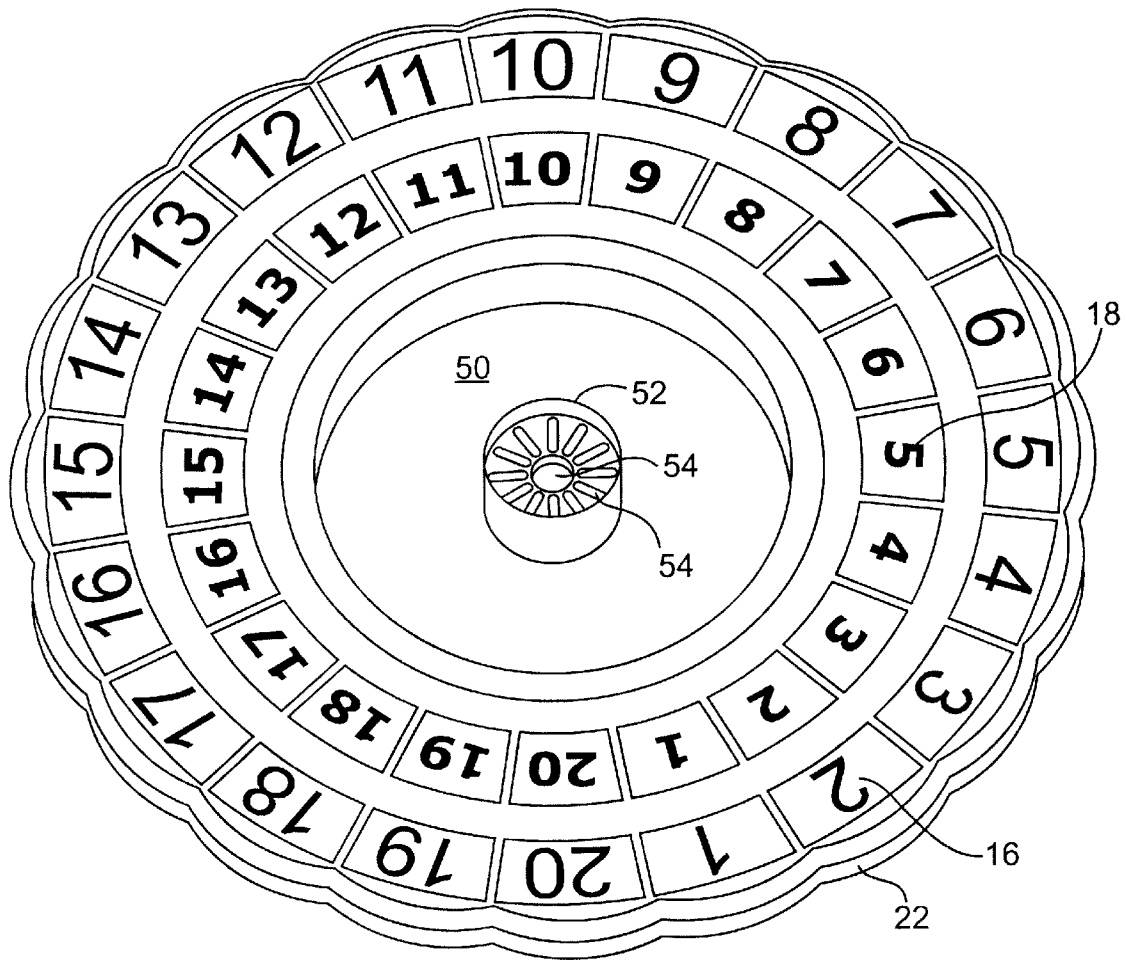
FIG. 3(b) shows a frontal view of rotating element according to another embodiment of the invention.

FIG. 3(b) shows a perspective view of another rotating element 22 according to an embodiment of the invention. The rotating element 22 shown in FIG. 3(b) has a first set of image elements 16 including the numbers 1 through 20. The rotating element 22 also includes a second set of image elements 18 that includes the numbers 1 through 20, but in a different form than in the first set of image elements 16. As in other embodiments, each of the images in the first set of image elements 16 corresponds to an image in the second set of image elements 18. A toy including the rotating element shown in this Figure can teach a child about number recognition.

Figure 3C:
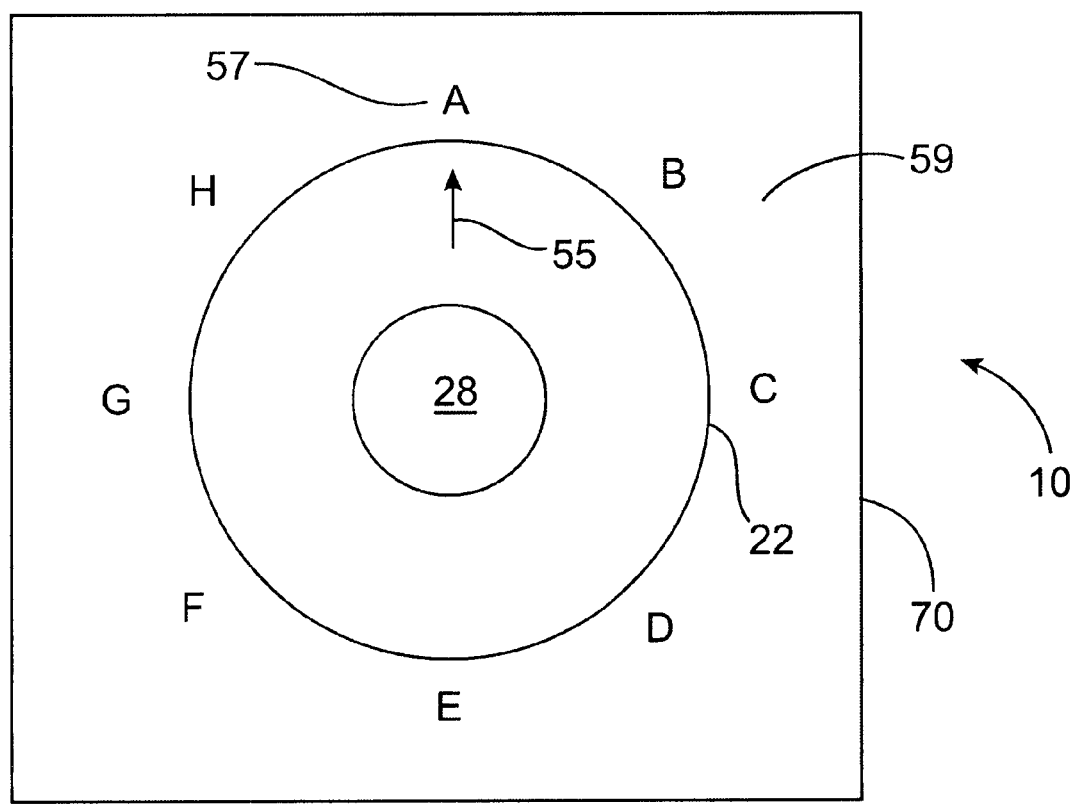
FIG. 3(c) shows a toy according to another embodiment of the invention. The toy includes a rotating element that does not include a plurality of elements.

FIG. 3(c) shows a schematic diagram of another rotating element 22 in a toy 10 according to another embodiment of the invention. In this example, the rotating element 22 does not include a first set of image elements or a second set of image elements. Instead, a pointer 55 is printed on the rotating element 22 and can point to image elements 57 arranged around the rotating element 22. In this example, the image elements 57 are printed around a border region 59 of a base. The border region 57 is cooperatively structured to receive the rotating element and the rotating element rotates within the border region 59. In this example, the image elements are schematically shown as the letters A through H. The letters A through H could be, for example, images of eight different animals (e.g., a cow, goat, pig, etc.).

After the child depresses the actuator 28, the rotating element 22 spins around and eventually stops. After the pointer 55 stops, the pointer 55 points to one of the image elements 57, and the toy 10 can produce an output that is associated with the particular image element. For example, the image element that the pointer 55 points to may be a picture of a cow, and after the pointer 55 points to the cow, the toy can produce the sound "Mooo!".

Figure 4:
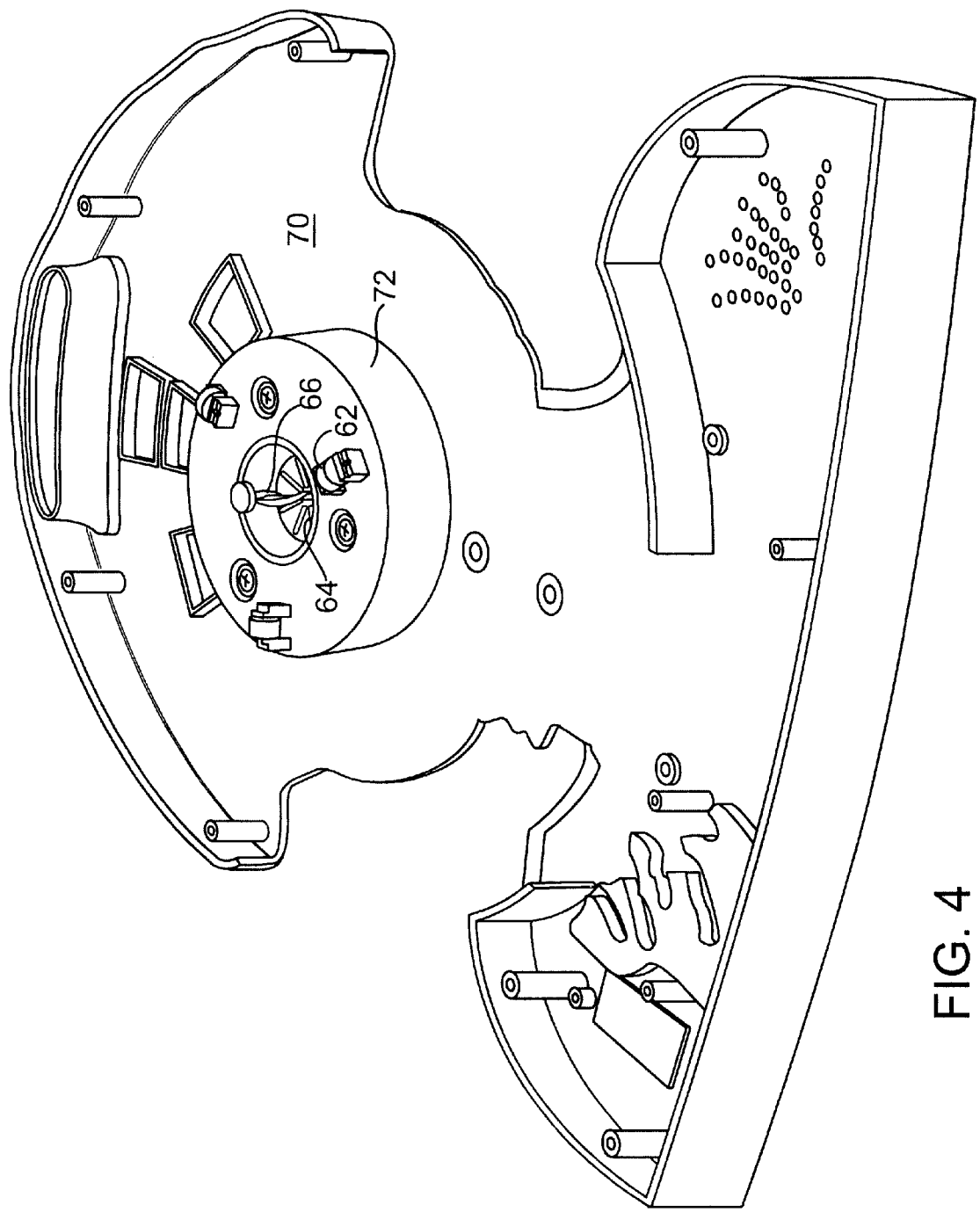
FIG. 4 shows a perspective view of the underside of a front cover according to an embodiment of the invention.

FIG. 4 shows the underside of the top cover 70 of an embodiment of the invention. The top cover 70 includes a raised, circular portion 72. A circular region 64 with teeth is inside of the raised, circular portion 72. A spiral screw 66 is inside of the circular region 64 with teeth. The circular region 64 with teeth engage the teeth (not shown) of the circular portion 72 on the rotating element (see, e.g., the region with teeth 54 on the rotating element 22 in FIG. 3(a)). The top cover 70 also includes a plurality of rollers 62 that can contact the rotating element (not shown) so that the rotating element moves with respect to the top cover 70. The rollers 62 may be lubricated (e.g., greased) as appropriate.

In operation, the child depresses the actuator passing through the cover 70. Pressing the actuator causes the spiral screw 66 to move down, and the spiral screw 66 causes the circular region 64 with teeth to rotate. The teeth on the circular region 64 engage corresponding teeth on the rotating element (not shown). The rotating circular region 64 causes the rotating element to rotate. The rollers 62 reduce the friction between the cover 70 and the rotating element, thus allowing the rotating element to spin relative to the top cover 70 and the base (not shown).

Figure 5:
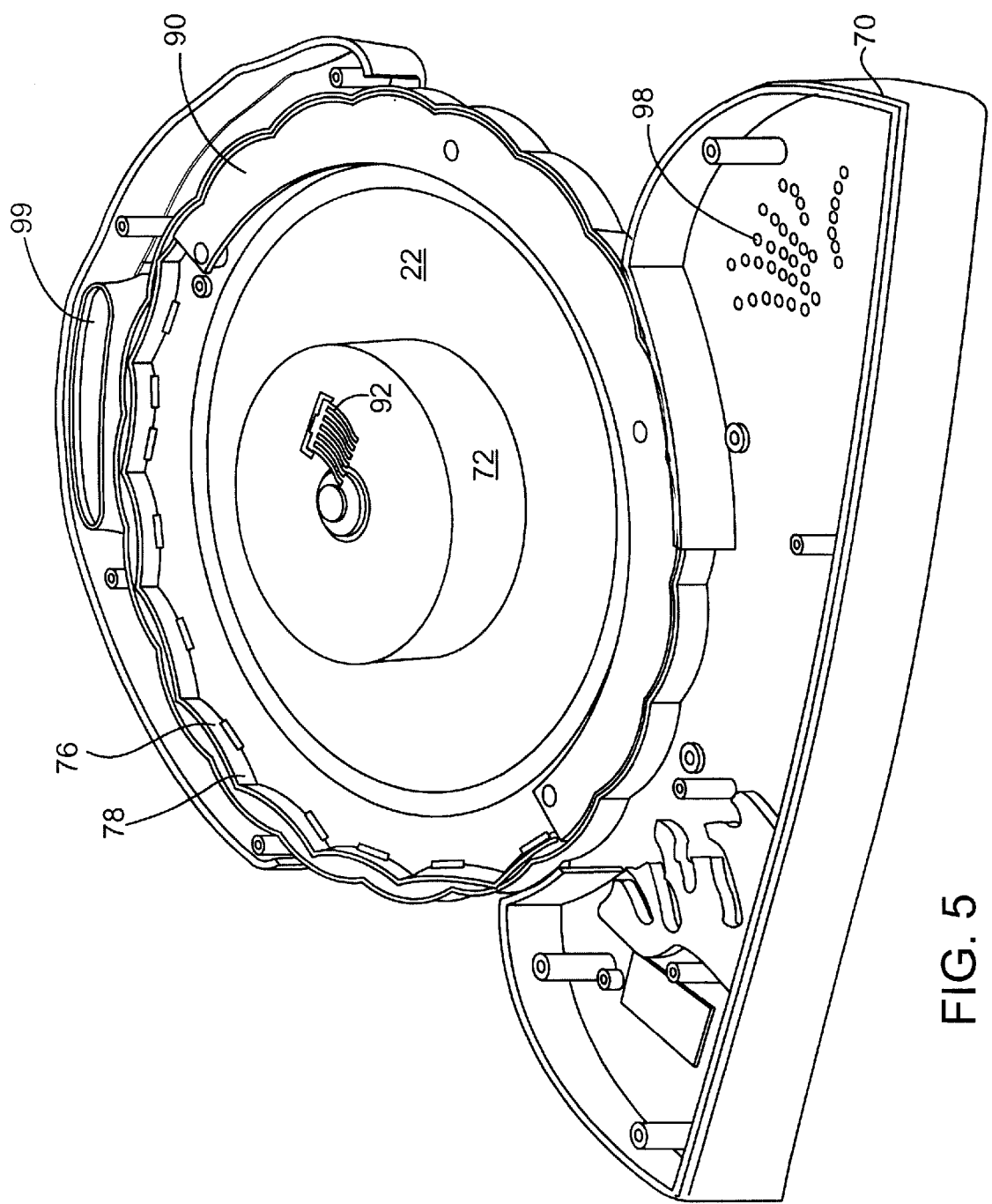
FIG. 5 shows a perspective view of the backside of a rotating element on the front cover shown in FIG. 4.

FIG. 5 shows the back of the rotating element 22 as it lies against the cover 70. As shown, the cover 70 includes holes 98 so that sound from an internal speaker can pass through the cover 70. The rotating element 22 includes a raised portion 72 that corresponds to the center depression (see, e.g., "50" in FIG. 3(a)) on the opposite side of the rotating element 22). A conductive element 92 with a plurality of conductive fingers is on the raised portion 72. The conductive fingers of the conductive element 92 contact predetermined conductive traces on a circuit card on the base of the toy when they are at a particular angular position. Thus, when the angular position of the conductive element 92 changes, the number and/or combination of conductive traces contacted may change. Thus, each angular position is associated with a different number and/or combination of conductive traces. In this way, a processor in the toy 10 can determine which image elements are currently being presented to the child. This aspect will be described in further detail below.

A magnetic structure 76 is disposed around the inner edge of the outer rim of the rotating element 22. In this example, the magnetic structure 76 forms a generally continuous circular shape, and has many peaks and valleys. In other embodiments, the magnetic structure 76 could be a discontinuous structure. An inner cover 90 covers the magnetic structure 76. The magnetic structure 76 can be used to automatically align the rotating element 22, and is described in further detail below.

Figure 6:
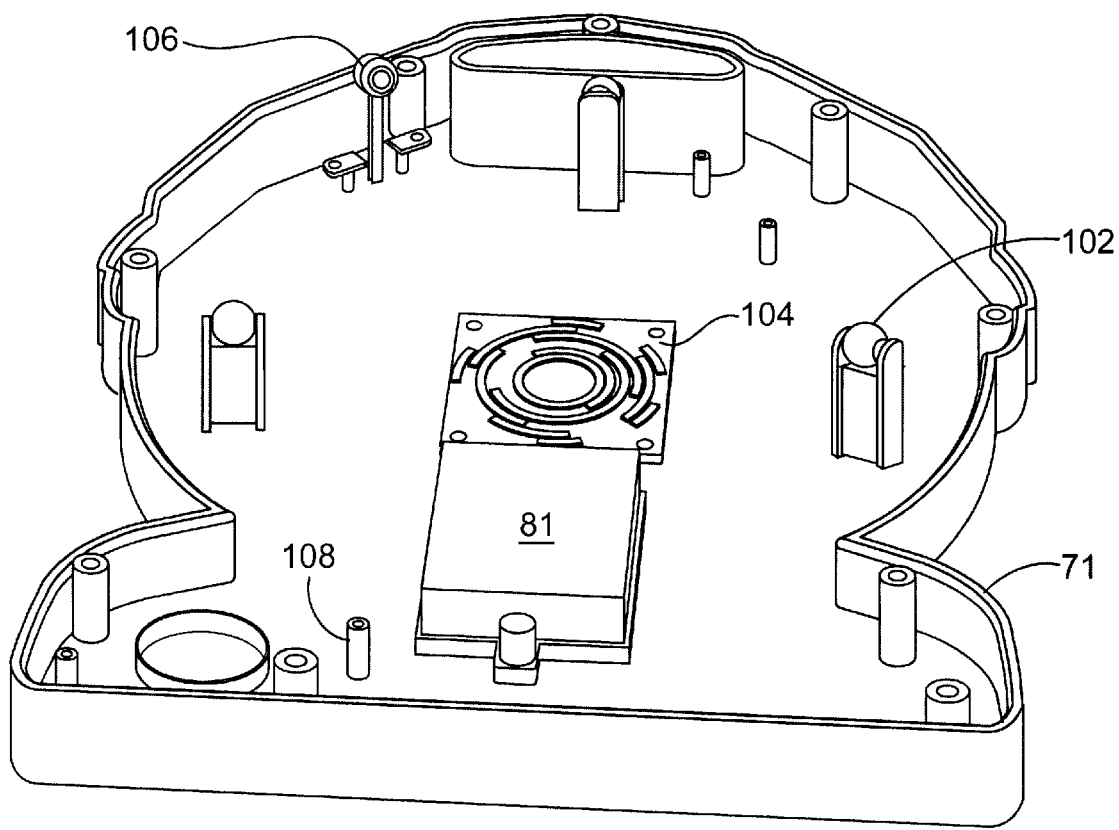
FIG. 6 shows a perspective view of the front of a base according to an embodiment of the invention.

FIG. 6 shows the front of the base 71. In this example, the base 71 also forms the back cover of the toy. The base 71 includes a plurality of rollers 102 that extend vertically from the major surface of the base 71. The rollers 102 reduce the friction between the base 71 and the rotating element (not shown) that would be on the base 71. A battery housing 81 is present in the base 71 to house batteries that can supply power to the toy.

A circuit card 104 with a pattern of conductive lines in the form of arcs is also on the base 71, and can be electrically coupled to a processor disposed within the toy. The conductive element with conductive fingers (see, e.g., element 92 in FIG. 5) on the back of the rotating element contact a predetermined number and/or combination of the conductive lines when the conductive fingers are at a particular radial position.

A magnetic stop element 106 is at a peripheral region of the base 71. The magnetic stop element 106 and the magnetic structure in the rotating element can automatically align the rotating element so that the image elements on it are within the windows on the cover of the toy. The magnetic stop element 106 can be a flexible plastic arm that extends from the major surface of the base 71. A magnet is at the end of the arm. When the motion of the rotating element 22 is slow enough, the magnet attracts a peak in the magnetic structure 76 and stops the rotating element 22.

Figure 7:
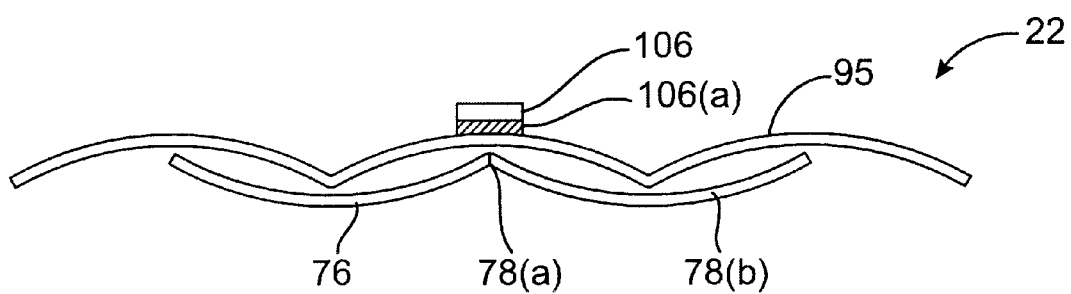
FIG. 7 shows top view of a portion of a toy including an undulating plastic wall, an undulating metal wall inside of the plastic wall, and a magnetic element outside of the plastic wall.

FIG. 7 is a schematic drawing of how the stop element 106 stops the rotating element 22 from rotating. Referring to FIG. 7, a portion of a rotating element 22 including an undulating edge region 98 and an undulating magnetic structure 76 is shown. The undulating edge region 98 of the rotating structure 22 may comprise molded plastic. The undulating magnetic structure 76 has peaks 78(a) and valleys 78(b) that correspond to the peaks and valleys in the undulating edge region 98 of the rotating element 22. In one embodiment, the undulating magnetic structure 76 is formed from a plurality of rigid, U-shaped magnetic strips that secured (e.g., glued) to the inner edge region surface of the rotating element from end to end. In another embodiment, the undulating magnetic structure 76 could be a single strip of magnetic material that is shaped so that the peaks in the shaped magnetic material correspond to the peaks in the edge region 98 of the rotating element 22. In yet another embodiment, the magnetic structure could be a discontinuous pattern of magnetic material that is secured or deposited on the inner surfaces of the edge region 98 where peaks are present.

A magnetic stop element 106 including a magnet 106(a) is disposed outwardly from the rotating element 22. After the rotating element 22 rotates, the speed of the rotating element 22 eventually decreases and the magnet 106(a) is attracted to the peak 78 in the magnetic structure 76 and completely stops the rotating element 22 from rotating. The rotating element 22 stops at a predetermined position and is automatically aligned.

Figure 8:
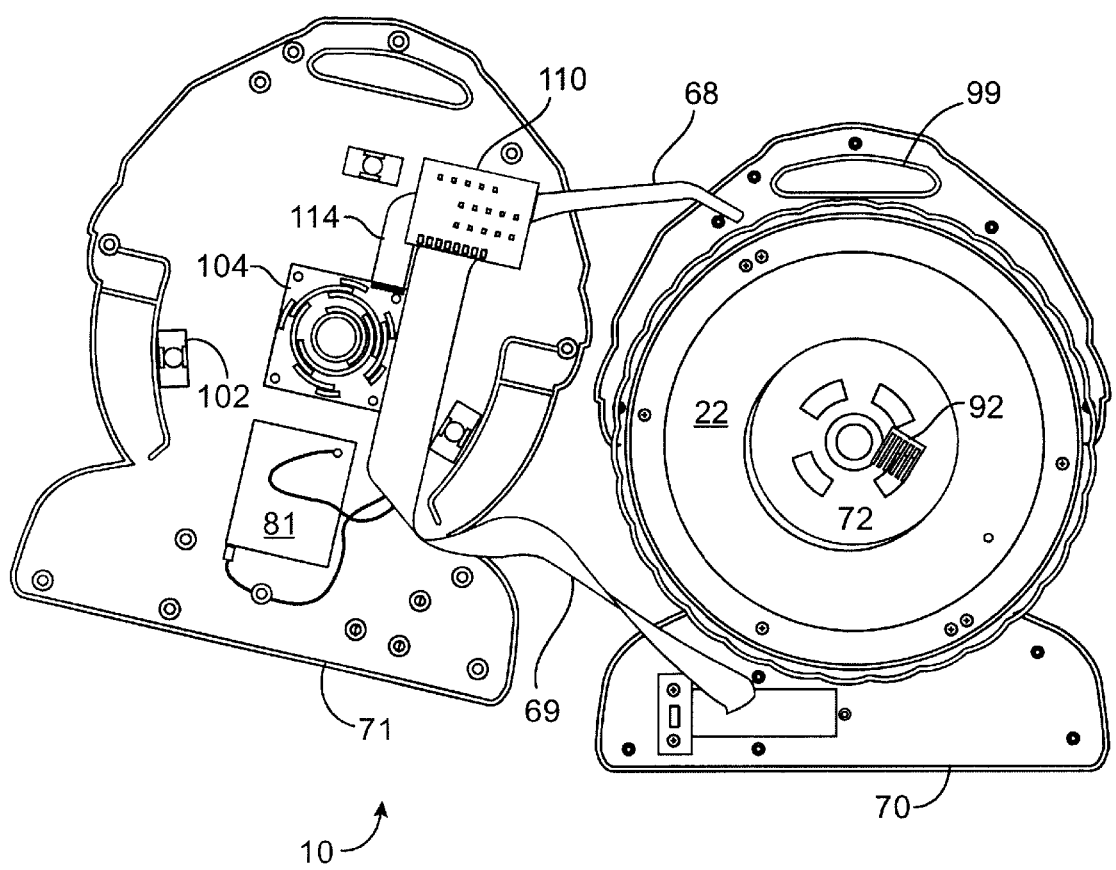
FIG. 8 shows a top view of a base and the backside of a rotating element on a front cover.

FIG. 8 shows a view of the front of the base 71 and the back of the top cover 70 and the back of the rotating element 22. Conductive connectors 68, 69 couple a circuit board 110 with a processor to buttons on the top cover 70 and a speaker. The base 71 and the top cover 70 can be secured together using any suitable securing mechanism (e.g., screws). When they are secured together, the rotating element 22 can rotate freely between them.

A circuit card 104 may be coupled to the circuit board 110 through a conductive connector 114. As shown, the circuit card 104 has curved conductive traces at six different radial positions. At different angular positions, the conductive fingers of the conductive elements 92 may bridge different combinations of the conductive lines. A processor (not shown) in the toy 10 can determine which number and/or combination of conductive traces have been short circuited by the conductive element 92 so that the processor can determine the specific position of the rotating element 22 and the particular output that will be provided to the user.

In some embodiments, a binary encoding scheme may be used. The particular number of conductive traces in the embodiment shown in FIG. 8 is more than sufficient to provide encode, for example, at least 26 different angular positions corresponding to the 26 letters of the alphabet. At least 26 different outputs can be provided for the 26 letters of the alphabet.

Figure 9:
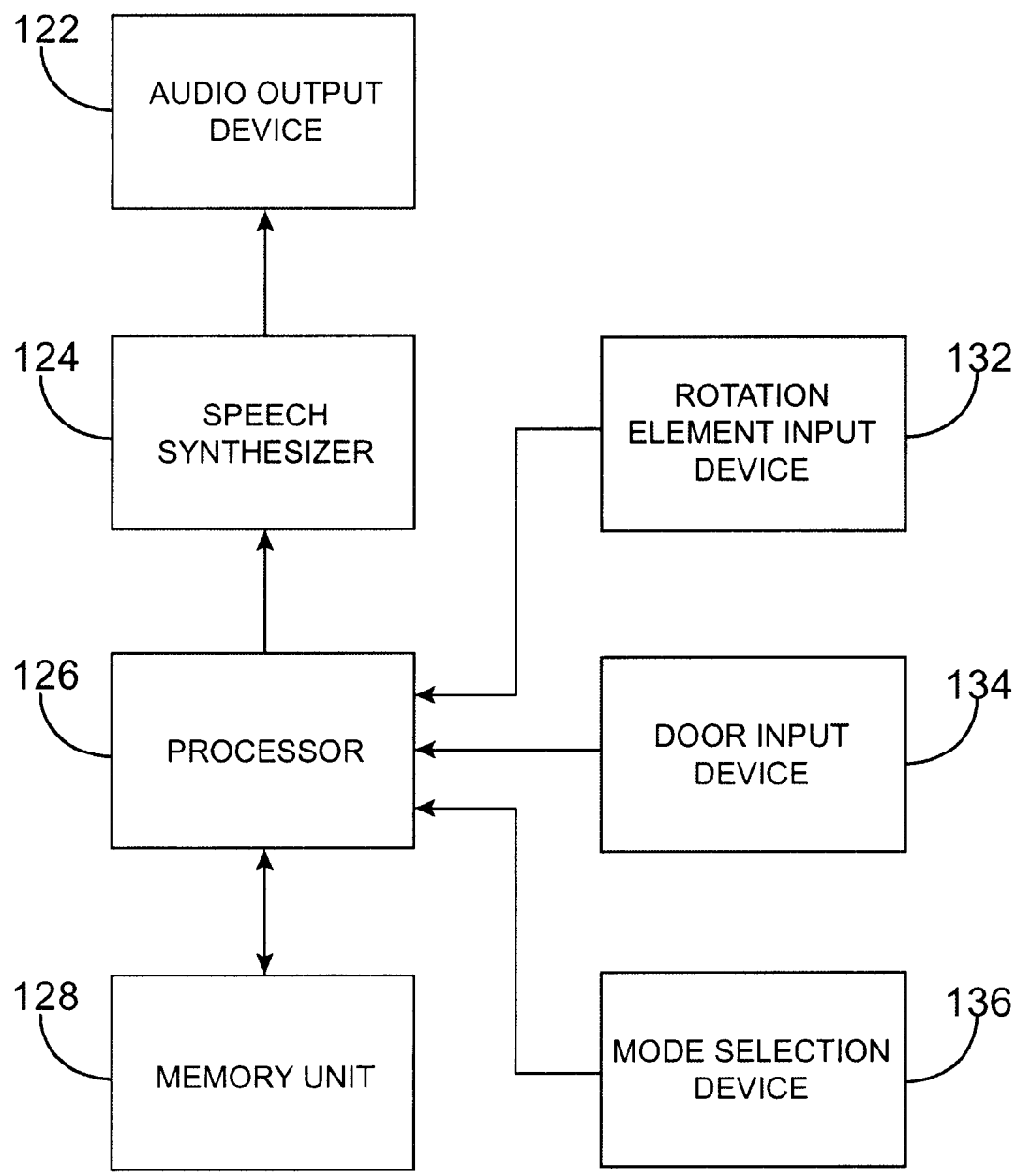
FIG. 9 shows a block diagram of some components of a toy according to an embodiment of the invention.

FIG. 9 shows a block diagram with some of the electronic components in a toy according to an embodiment of the invention. The toy may include a processor 126 such as a microprocessor. A memory unit 128, input devices 132, 134, 136, a speech synthesizer 126, and an audio output device 122 may each be operationally coupled (directly or indirectly) to the processor 86. A display device (not shown) such as an LCD (liquid crystal display) or an LED (light emitting diode) screen could also be coupled to the processor 86. Typically, power is supplied to the study aid apparatus using standard disposable or rechargeable batteries (e.g., size AA batteries). In addition, the toy may include an automatic shut off feature that shuts off the toy if the child does not interact with it in a predetermined period of time.

Figure 10:
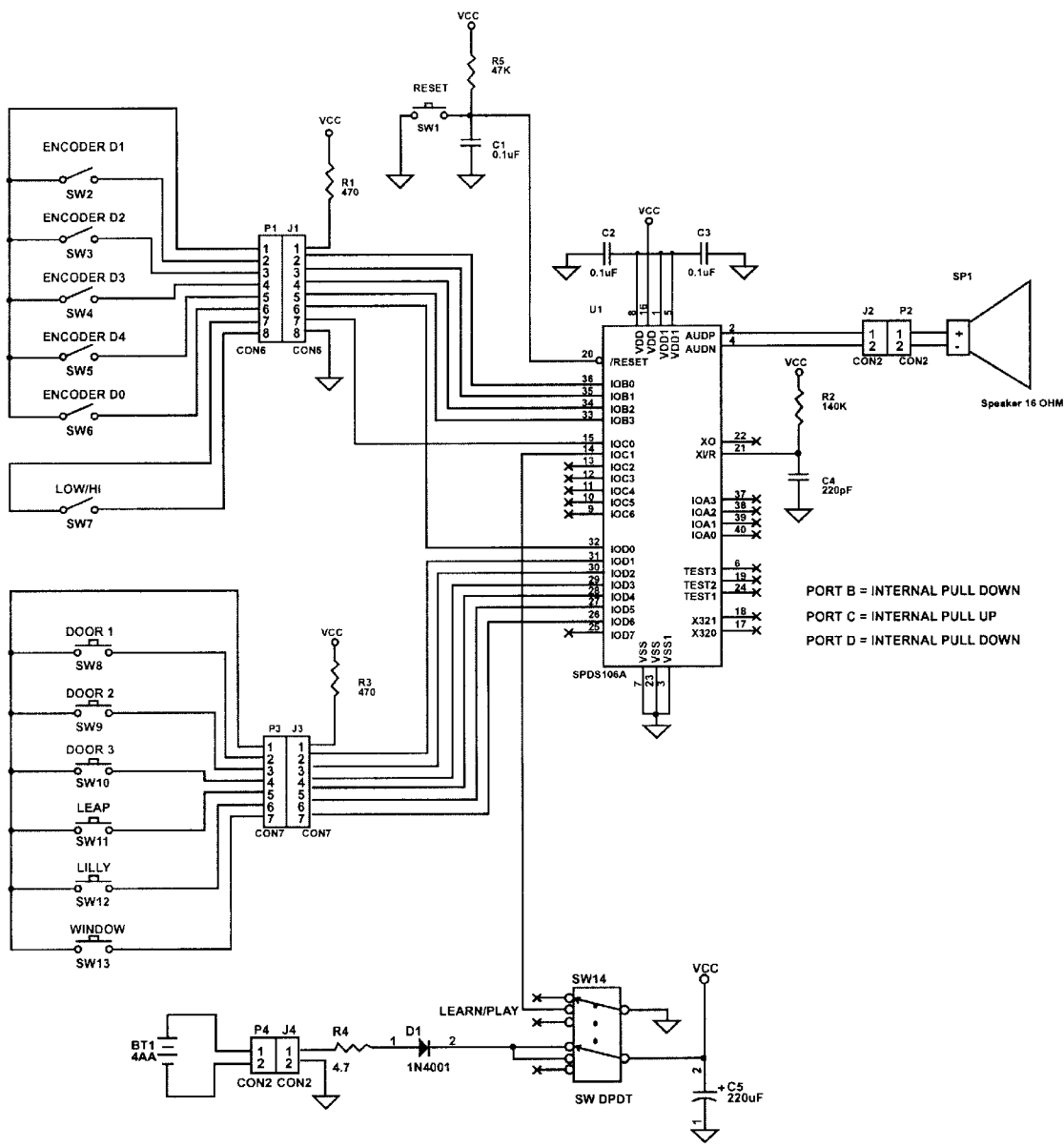
FIG. 10 shows an electrical schematic diagram of some components of a toy according to an embodiment of the invention.

Any suitable circuit configuration may be used in embodiments of the invention. For example, FIG. 10 shows an exemplary circuit diagram of an embodiment of the invention. It is understood that other suitable circuits could alternatively be used in embodiments of the invention, and embodiments of the invention are not limited to the specific circuit implementation shown in FIG. 10.

Referring again to FIG. 9, any suitable type or number of input devices 132, 134, 136 may be included in the toy. For example, a rotating element input device 132, one or more door input devices 134, and one or more mode selection devices 134 may be included in embodiments of the invention. As noted above, the door input devices 134 could alternatively be depressible buttons that correspond to the windows. A child could select image elements by depressing appropriate buttons.

The memory unit 128 may be any suitable temporary or permanent information storage device. For example, the memory unit 128 may include one or more of optical, magnetic, or electronic storage media such as optical or magnetic disks, tapes, sticks, and the like. Storage devices such as these may be used alone or in combination to make up the memory unit 128. Any suitable number of RAM (random access memory), ROM (read only memory) and EPROM (erasable programmable memory) chips may also be included in the memory unit 128. In some embodiments, the ROM can include a memory storage capacity of about 2 MB (megabytes) or more, although the storage capacity is likely to change as data storage technology improves.

The speech synthesizer 124 may be a separate speech synthesizer chip or speech synthesizer circuitry that can be on the same or different chip as the processor 86. Suitable speech synthesizer chips are commercially available. An exemplary speech synthesizer chip is an SPDS 106 chip, which is commercially available.

The audio output device 122 may include a speaker, or an audio jack or connection for a headphone or an earphone. An audio amplifier (not shown) may amplify any signals to the audio output device 122. In some embodiments, the audio output device 84 may include an audio jack.

Embodiments of the invention may also use a transferable information storage medium (not shown) to provide new content and/or new operational code for the toy. The transferable information storage medium may be in the form of, for example, a cartridge (e.g., in a flash data cartridge), a disk, a tape, or a memory stick. Cartridges are especially desirable since they can be easily manipulated and handled by children. Any suitable amount of storage space may be provided on the transferable information storage medium. The transferable information storage media may be volatile or non-volatile in nature, and can be used to transfer information to and from the toy. An appropriate recess may be provided in the toy to receive the transferable information storage medium.

In some embodiments, the transferable information storage medium may be used to "refresh" the content of the toy, so that different or updated (e.g., more challenging) content can be provided to the toy. For example, as noted above, the toys according to embodiments of the invention may include a game mode or a music mode. Different games and/or different music can be provided to the toy using, for example, the transferable information storage medium. The transferable information storage medium may be hard coded with updated music or games. Alternatively, the transferable information storage medium may receive the new code for the music or games from a server computer via the Internet.

Figure 11:
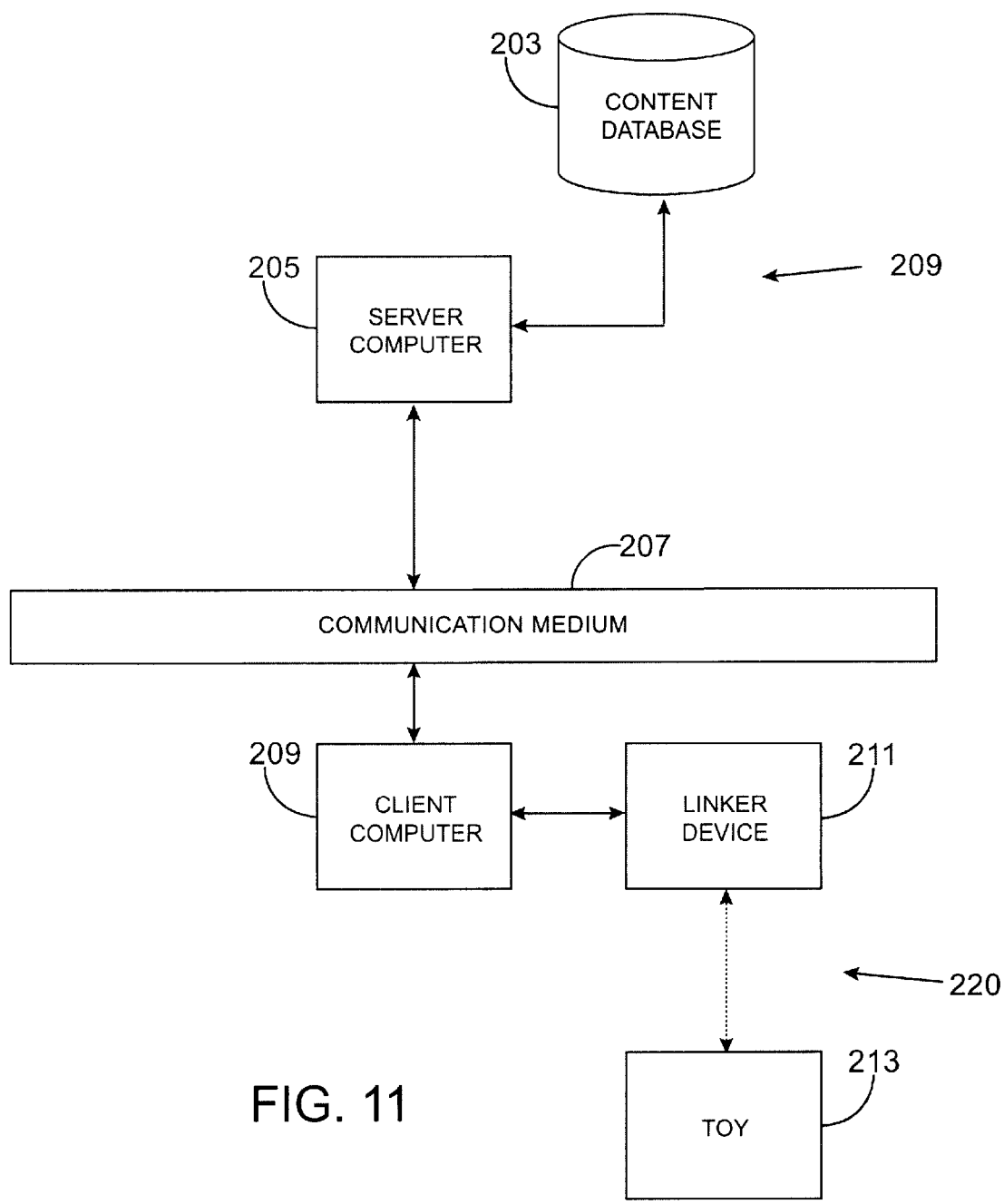
FIG. 11 shows a system according to an embodiment of the invention.

A system that can be used to obtain more updated content is shown in FIG. 11. The system includes a host site 209 and a user site 220. The user site 20 may be, for example, a home, school, or workplace. The host site 209 and the user site 220 are coupled through a communication medium 207. Many user sites may be present. However, only one user site is shown for simplicity of illustration. The host site 209 may include a server computer 205 operated by a host company. In this example, the host site 209 has a server computer 205 that can access a content database 203.

The server computer 205 is typically a powerful computer or cluster of computers. For example, the server computer can be a large mainframe, a minicomputer cluster, or a group of servers functioning as a unit. In one example, the server computer may be a database server coupled to a Web server. The server computer can behave as a single computer that services the requests of one or more client computers. For example, one or more client computers 209 at different user sites can communicate with the server computer through the communication medium 207 and optionally through one or more Internet Service Providers (ISPs) (not shown). The client computers typically have less memory and less computing power than the server computer 205. The server computer 205 can be remotely located with respect to the client computer 209.

The server computer 205 can have computer code for performing any suitable function. For example, the server computer 205 can have code for updating a user profile in a user profile database, retrieving data from any suitable database, and sending data to any person. Computer code may also be provided for selecting content for a content package, assembling the content package, and sending the content package to the user. The content package may include code for audio outputs, code for graphic outputs, code for instructions to play audio or graphics output, etc.

The server computer 205 and the client computer 209 communicate through a communication medium such as the Internet, and more particularly the World Wide Web (WWW). Typical communication protocols that can be used by the server computer 205, the client computer may include HTTP (hypertext transfer protocol), TCP/IP (terminal communication protocol /Internet protocol), or other protocol.

The server computer 205 may have data representing a Web site. The Web site may have any suitable number of Web pages and is preferably entertaining to users under 18 years of age. On the Web site, the user (or other person such as the user's parents) can, for example, create a user profile, set operational preferences, play games, and select content for a content package.

The content database 203 may include any suitable content. The content may include information that can be used to update the operation of the toy. Examples of such information include new problems, new games, new songs, and new greetings and messages that can be played by the toy. Operational code (e.g., to update an operating system) could also be present in the content database 203 and could be sent to the child.

The content in the content database 203 and the electronic content that may be in the toy 213 itself may be in any suitable form. For example, the content may be in the form of compressed or uncompressed data. The content may be in the form of sound files such as MP3 files, WAV files, and MIDI (Musical Instrument Digital Interface) files. The content may also be in the form of graphic files such as video files, image files (e.g., bitmaps), and text files.

At the user's site 220, a client computer 209 can be operatively coupled to a linker device 211. The linker device 211 may be coupled to the client computer 109 through a wireless or a wired link (e.g., a cable). The toy 213 can receive computer code from the server computer 205 through the client computer 109 via the linker device 111.

The client computer 209 may have any suitable characteristics. For example, the client computer 109 can be an ordinary personal computer running a Windows™ based operating system. It may have a suitable Internet browser such as Microsoft Explorer™.

The linker device 211 may be any suitable device capable of transferring data between the client computer 209 and the toy 213. The linker device 211 could be, for example, a wireless transceiver such as a wireless RF (radio frequency) transceiver or an infrared transceiver. In preferred embodiments, however, the linker device 211 is capable of reading information from, and writing information to, the transferable information storage medium. In a typical embodiment, the transferable information storage medium may be a cartridge that can be inserted into both the linker device 211 and the base unit of the toy 213. Using the linker device 211, data can be transferred to the toy directly or indirectly.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed. Moreover, any one or more features of any embodiment of the invention may be combined with any one or more other features of any other embodiment of the invention, without departing from the scope of the invention. For example, although the specific embodiment shown in FIG. 1 does not include a music mode and the specific embodiment shown in FIG. 2 does include a music mode, it is understood that embodiments of the invention would include a toy of the type shown in FIG. 1 with a music mode.

What is claimed is:

1. A toy comprising:
   a) a base;
   b) a rotating element on the base, wherein the rotating element is adapted to rotate about an axis;
   c) a first set of image elements on the rotating element, wherein each image element in the first set is positioned at a first radial distance from the axis; and
   d) a second set of image elements on the rotating element, wherein each image element in the second set is positioned at a second radial distance from the axis, wherein the first distance is different than the second distance, and
   wherein the toy further comprises an actuator capable of causing the rotating element to rotate, wherein the actuator comprises a depressible element centered about the axis.

2. The toy of claim 1 wherein the image elements in the first set of image elements and image elements in the second set of image elements are respectively related to each other.

3. The toy of claim 1 wherein the image elements in the first set of image elements comprise letters and the image elements in the second set of image elements comprise images of objects that begin with the letters in the first set of image elements.

4. The toy of claim 1 wherein the image elements in the first set of image elements comprise images of animals and the image elements in the second set of image elements comprise images of animals.

5. The toy of claim 1 wherein the image elements in the first set of image elements or the second set of image elements comprise numbers.

6. The toy of claim 1 wherein the first set of image elements or the second set of image elements comprise images of objects.

7. The toy of claim 1 further comprising:
   a cover, wherein the rotating element is between the cover and the base and the rotating element is capable of rotating between the cover and the base.

8. The toy of claim 1 further comprising:
   a cover with a set of windows, wherein each window in the set exposes one or more of the image elements.

9. The toy of claim 1 further comprising:
   a cover with a set of windows and a single window, wherein each window in the set of windows exposes one or more of the image elements in the second set of image elements, and the single window exposes an image element from the first set of image elements.

10. The toy of claim 1 further comprising:
    a cover with a set of windows, wherein each window in the set of windows exposes one or more of the image elements, and wherein the cover further comprises a plurality of slidable doors respectively associated with the windows in the set of windows.

11. The toy of claim 1, wherein the toy is capable of playing a song while the rotating element rotates.

12. The toy of claim 1, wherein the toy further comprises:
    a processor; and
    a memory unit operatively coupled to the processor.

13. The toy of claim 1, wherein the toy further comprises a game mode and a learn mode.

14. The toy of claim 1, wherein the toy further comprises:
    a magnetic stop element adapted to stop the rotating element.

15. A toy comprising:
    a) a base;
    b) a rotating element on the base, wherein the rotating element is adapted to rotates about an axis;
    c) a set of image elements on the rotating element, wherein each image element in the set is positioned at a radial distance from the axis; and
    d) an actuator coupled to the rotating element, and wherein dip toy further comprises a cover that is disposed over the rotating element, wherein the actuator passes through the cover.

16. The toy of claim 15 wherein the toy is adapted to teach children about letters and numbers.

17. The toy of claim 15 further comprising:
a processor; and
a memory operatively coupled to the processor.

18. A toy comprising:
a) a base;
b) a rotating element on the base, wherein the rotating element is adapted to rotate about an axis;
c) a first set of image elements on the rotating element wherein each image element in the first set is positioned at a first radial distance from the axis;
d) a second set of image elements on the rotating element, wherein each image element in the second set is positioned at a second radial distance from the axis, wherein the first distance is different than the second distance;
e) an actuator capable of causing the rotating element to rotate, wherein the actuator is a depressible element centered about the axis;
f) a cover disposed over the rotating element, wherein the actuator passes through the cover;
g) a processor in the base;
h) a memory in the base and operatively coupled to the processor;
i) a first window exposing one of the first image elements through the cover;
j) a set of windows exposing a plurality of image elements in the second set of image elements;
k) a plurality of sliding doors associated with the set of windows; and
l) a plurality of switches coupled to the sliding doors and coupled to the processor.

19. The toy of claim 18 further wherein the rotating element is exposed through the cover and is capable of being directly manipulated by a user.

20. The toy of claim 18 further comprising a mode switch coupled to the processor, wherein the mode switch is capable of switching between a plurality of operational modes including a game mode and a music mode.

21. The toy of claim 18 wherein the plurality of sliding doors are partially translucent or transparent.

22. The toy of claim 18 wherein the rotating element has an undulating outer edge.

23. The toy of claim 18 wherein the rotating element has a magnetic stop element that is adapted to stop the rotating element from rotating.

24. The toy of claim 22 wherein the rotating element has a magnetic stop element that is adapted to stop the rotating element from rotating.

25. The toy of claim 1 wherein the rotating element has an undulating outer edge.

26. The toy of claim 25 wherein the rotating element has a magnetic stop element that is adapted to stop the rotating element from rotating.

27. The toy of claim 26 wherein the magnetic stop element comprises a flexible arm.

28. The toy of claim 1 further comprising a plurality of rollers in contact with the rotating element.

* * * * *